Figures 1, 2:
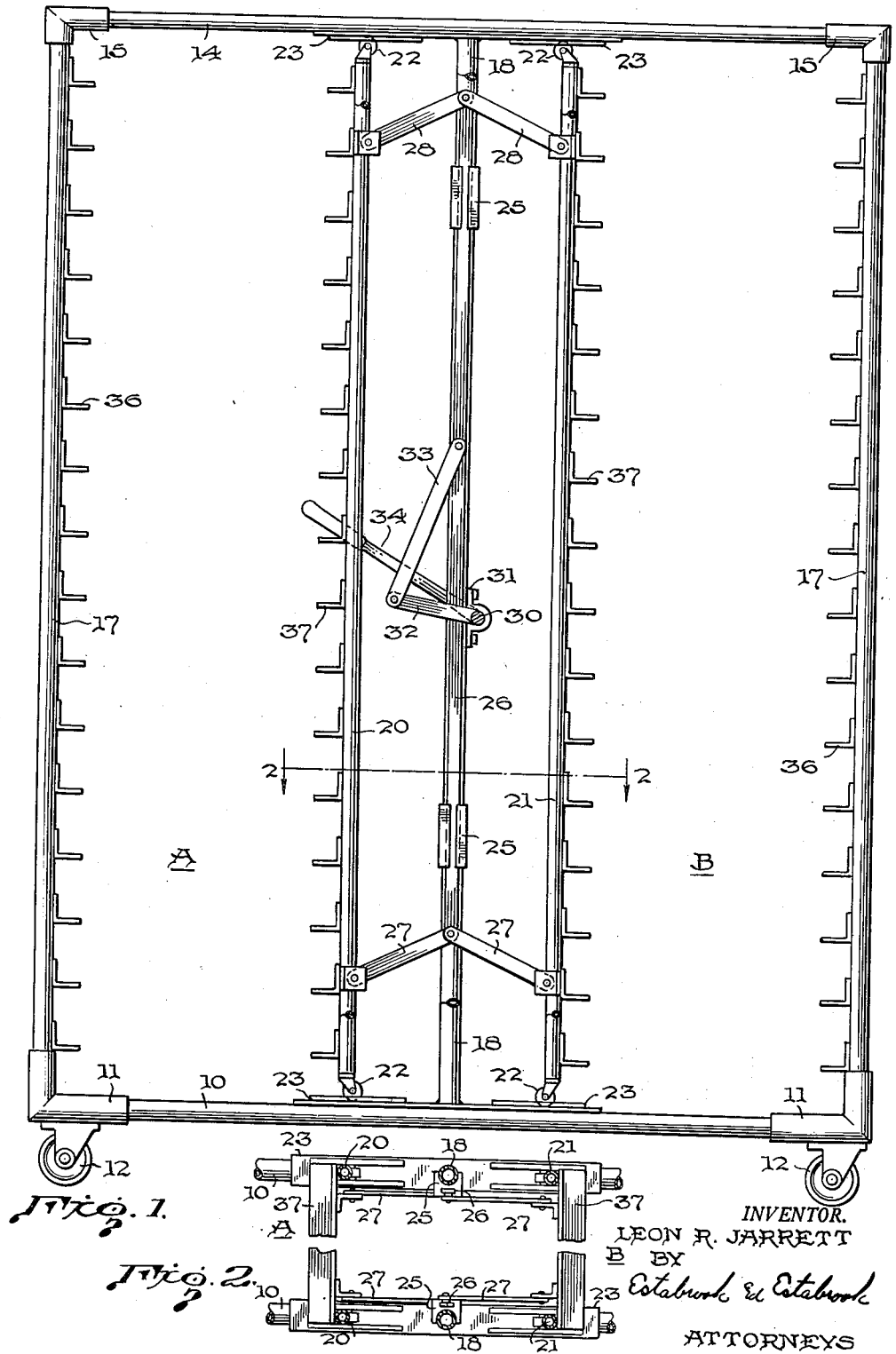

June 10, 1952 — L. R. JARRETT — 2,600,298

RACK

Filed Feb. 23, 1950

INVENTOR.
LEON R. JARRETT
BY
Estabrook & Estabrook
ATTORNEYS

Patented June 10, 1952

2,600,298

UNITED STATES PATENT OFFICE 2,600,298

RACK

Leon R. Jarrett, Nashville, Tenn., assignor of one-half to Frank H. Alley, Nashville, Tenn.

Application February 23, 1950, Serial No. 145,605

4 Claims. (Cl. 211—41)

The present invention relates broadly to racks and more particularly to an adjustable rack for the reception and support of pans, trays or other receptacles.

While the rack of the present invention is susceptible of many and varied uses it has been found to be particularly adaptable to the bakery and confectionery trades. The rack is primarily designed for supporting trays or pans of the type employed by bakers and the like and is capable of conveying said pans or trays to and from the ovens in either a filled or emptied condition.

In the bakery and confectionery trades the present trend is to employ pans and trays of various sizes and capacities. Such a situation is quite prevalent in the bakery trade wherein bakers use pans of various widths in the preparation and baking of cakes, pies, buns and similar pastries. The use of varying width pans or trays necessitates having a number of portable racks, for conveying said pans to and from the oven, and the size of the portable racks must be commensurate with the size of the pans being employed for the particular baking operation. Such an arrangement tends to pose an unwarranted expense on the baker in procuring and maintaining a number of portable pan or tray racks of various sizes.

One of the objects of the present invention is to provide a portable rack for supporting a plurality of pans in spaced superposed relation.

Another object of the present invention is to provide a portable rack which is capable of being adjusted for supporting pans or trays of various sizes.

Another object of the present invention is to provide a rack composed of a plurality of compartments with one side of each compartment being adjustable with respect to the other side of each compartment.

A further object of the present invention is to provide a portable rack having a single adjusting means for varying the spacing between complementary pan supporting members.

A still further object of the present invention is to provide a portable adjustable rack which is simple of construction, economical of manufacture and which will be reliable and efficient in service.

Other objects and advantages more or less ancillary to the foregoing and the manner in which all the various objects are realized will appear in the following description, which considered in connection with the accompanying drawings, sets forth the preferred embodiment of the invention.

Referring to the drawings wherein the preferred embodiment of the invention is illustrated:

Figure 1 is a vertical sectional view of the portable rack constituting the subject matter of the present invention; and Figure 2 is a horizontal sectional view showing certain of the adjusting features of the present invention, the section being taken on line 2—2 of Figure 1.

Referring to the drawings therein is shown a portable rack of the present invention embodying a base portion of rectangular configuration comprising a pair of tubular side rails or members 10 disposed in spaced parallel relation. The respective ends of the side rails 10 are secured to tubular end rails or members, not shown, by connectors 11. A caster wheel 12, of a conventional design, is secured to the bottom face of each of the four connectors 11 to facilitate the moving of the rack from place to place.

The top portion of the rack is of a configuration complementary to the base portion and comprises tubular side rails or members 14 joined to tubular end rails or members, not shown, by connectors 15. A plurality of vertically disposed rods or members 17 are interposed between and secured to the connectors 11 and 15 and define the vertical end frame portions of the rack.

A pair of diametrically disposed rods 18 are interposed between the top and bottom portions of the rack and divide the rack into a pair of compartments or sections A and B. The rods 18 are secured to the top face of the members 10 and to the bottom face of the members 14 by spot welding or any other suitable means. A pair of vertically disposed rods 20 are arranged in spaced parallel relation within the compartment A intermediate the bottom members 10 and the top members 14. A second pair of rods 21 are positioned in the compartment B. Both sets of rods 20 and 21 are positioned intermediate the center rods 18 and the end frames 17 of the rack with the ends of the rods 20 and 21 provided with rollers 22 which are arranged to move in tracks or guideways 23 secured to the top and bottom members 10 and 14. Thus the rods 20 in the compartment A and the rods 21 in the compartment B define intermediate frame members which are capable of being moved between the center rods or posts 18 and the end frames 17 by means of the rollers 22 riding in the track or guideways 23.

The center posts or rods 18 have slidably mounted thereon, adjacent their respective ends, sleeves or collars 25 which are retained in spaced relation by bars 26. The bars 26 are positioned along the inner faces of the center posts 18 and the ends of the bars extend beyond the collars 25. A pair of oppositely disposed arms 27 are pivotally connected to the lower ends of each of the bars 26 while a similar pair of arms 28 are pivotally connected to the upper ends of each of the bars 26. The free ends of the arms 27 and 28 are secured, by suitable connecting means, to the rods 20 and 21 in the compartments A and B. Thus upon moving the collars 25 and the bars 26 along the center posts 18 the arms 27 and 28 will be either extended or contracted due to their pivotal connection with the ends of the bars 26. The extension or contraction of the arms 27 and 28 will move the rods 20 and 21, within the compartments A and B, towards or away from the center posts 18.

The actuation mechanism for the arms 27 and 28 and bars 26 comprises a transverse rod 30 rotatably supported in brackets 31 that are mounted on the center posts 18. A pair of levers 32, disposed in a plane at right angles to the longitudinal axis of the rod 30, each have one end rigidly secured to the rod 30 while the other end of the levers is pivotally connected to arms 33. The free end of the arms 33 are pivotally connected to the bars 26. The ends of the rod 30 projects beyond the brackets 31 and center posts 18 and are configured to receive an operating handle 34. While the handle 34 is readily attachable to either end of the rod 30 for actuating same and can then be removed, it is within the scope of the present invention that the handle 34 may be rigidly secured to either end of the rod 30.

The rods 17 defining the end frames of the portable rack have mounted on their inner faces, intermediate the top and bottom members 10 and 14, a plurality of angle irons 36 arranged in spaced superposed relation to one another. The rods 20 and 21, in the compartments A and B, respectively, have secured thereto a plurality of spaced angle irons 37 which are disposed in aligned relation with the angle irons 36 on the end frame members 17. The angle irons 36 and 37, in the compartments or sections A and B form shelves or supports for a plurality of pans, trays or other receptacles. The angle irons 36 and 37 may be secured to the end frame members 17 and the rods 20 and 21 by spot welding or any other suitable means.

While the pan or tray supports 36 and 37 are shown as angle iron secured to the end frame members 17 and the rods 20 and 21 it is readily apparent that other forms of supports may be employed, such as pins, bars or telescoping rods secured to the members 17 and 20 and 21. Furthermore the actuating arms 27 and 28 may be secured to either the rods 20 and 21 or connected to one of the angle irons 37 which are mounted on the rods 20 and 21.

It is within the scope of the present invention that angle irons or similar metallic members could be substituted for the tubular rods defining the top, bottom and end portions of the rack. If angle irons were utilized in the top and bottom portions of the rack it would not be necessary to employ the track or guideways 23 for the rollers 22 as the angle irons would define the track for said rollers.

The rack of the present invention is susceptible of use or operation for supporting and transporting a plurality of pans or trays. With the various parts and elements of the present invention assembled in the manner as shown in the drawings, the handle 34 may be rotated through an arcuate path of movement which will cause the bars 26 to move along the center posts 18 for either advancing or retracting the rods 20 and 21 with respect to the end frame members 17. Assuming that a plurality of pans or trays of a small width or size are to be loaded upon the supports 36 and 37 it will be necessary to rotate the handle 34 to advance the rod 20 and 21 towards the end frames 17 and thus reduce the size of the compartments A and B. Thus dependent upon the size of the particular pans that are to be supported and carried by the rack the size of the compartments A and B, with respect to the end frame members 17, can be increased or decreased by moving the rods 20 and 21 with their supports 37 through the actuating mechanism mounted on the center posts 18.

I claim:

1. A rack comprising top, bottom and end frames, center posts interposed between said top and bottom frames, a pair of intermediate frame members positioned between said top and bottom frames adjacent said center posts and means carried by said center posts and engaging said intermediate frame members for simultaneously varying the distance between said intermediate frame members and said end frames.

2. A rack comprising top, bottom and end frames, a pair of center posts interposed between said top and bottom frames and defining a plurality of compartments, guideways provided on the inner faces of the top and bottom frames, an intermediate frame member positioned between the top and bottom frames in each of said compartments, said intermediate frame members engaging said guideways, a plurality of spaced supports mounted on the complementary faces of said end frames and the intermediate frame members and defining shelves and actuating means on said center posts connected to the intermediate frame members for simultaneously moving said intermediate frame members towards and from said center posts on said guideways.

3. A rack comprising top, bottom and end frames, a pair of center posts interposed between said top and bottom frames and defining a plurality of compartments, guideways provided on the inner faces of the top and bottom frames, an intermediate frame member positioned between the top and bottom frames in each of said compartments, rollers mounted on the ends of the intermediate frame members and engageable with said guideways for moving said intermediate frame members within their respective compartments, a plurality of spaced supports mounted on the complementary faces of said end frames and the intermediate frame members and defining shelves, bars slidably mounted on said center posts, a plurality of arms pivotally connected to said bars and intermediate frame members, an actuating rod mounted on said posts, a handle secured to said rod, an arm affixed to said rod and a lever interposed between said arm and bars for simultaneously moving said intermediate frame members with respect to said end frames upon the actuation of said handle.

4. A rack comprising top, bottom and end frames, a pair of center posts interposed between said end frames and connected to said top and bottom frames, a pair of intermediate frame members positioned between the top and bottom frames on opposite sides of said center posts and arranged to move on said top and bottom frames and means carried by said center posts for simultaneously moving said intermediate frame members towards and from their respective end frames and said center posts.

LEON R. JARRETT.

REFERENCES CITED

The following references are of record in the file of this patent:

UNITED STATES PATENTS

| Number | Name | Date |
|---|---|---|
| 357,609 | Landers | Feb. 15, 1887 |
| 551,403 | Proctor | Dec. 17, 1895 |
| 1,355,033 | Cheape | Oct. 5, 1920 |
| 1,620,821 | Kornitz | Mar. 15, 1927 |
| 2,264,086 | Landau | Nov. 25, 1941 |
| 2,425,610 | Finley | Aug. 12, 1947 |
| 2,444,776 | Kalning et al. | July 6, 1948 |

FOREIGN PATENTS

| Number | Country | Date |
|---|---|---|
| 154,390 | Germany | Dec. 31, 1903 |